No. 715,556. Patented Dec. 9, 1902.
J. B. CROWDER.
FERTILIZER DISTRIBUTER AND PLANTER.
(Application filed May 19, 1902.)
(No Model.)
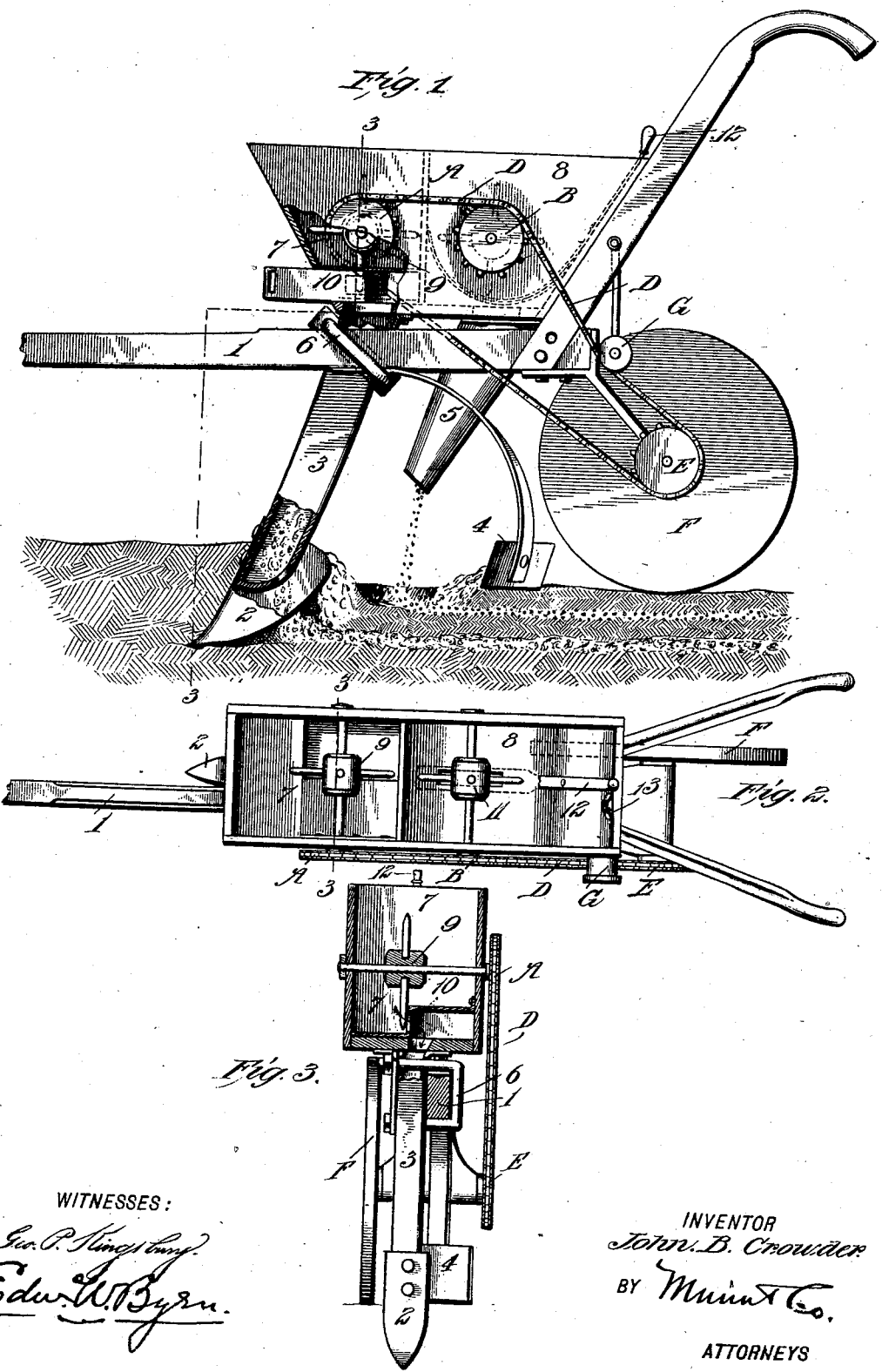
WITNESSES:
Geo. P. Kingsbury
Edw. W. Byrn.
INVENTOR
John B. Crowder
BY Munn & Co.
ATTORNEYS
THE NORRIS PETERS CO., PHOTO-LITHO., WASHINGTON, D. C.

United States Patent Office.

JOHN B. CROWDER, OF TALUCAH, ALABAMA.

FERTILIZER-DISTRIBUTER AND PLANTER.

SPECIFICATION forming part of Letters Patent No. 715,556, dated December 9, 1902.

Application filed May 19, 1902. Serial No. 107,984. (No model.)

*To all whom it may concern:*

Be it known that I, JOHN B. CROWDER, of Talucah, in the county of Morgan and State of Alabama, have invented a new and useful Improvement in Fertilizer-Distributers and Planters, of which the following is a specification.

The object of my invention is to provide a device for distributing and depositing guano or other fertilizer beneath cotton-seed, corn, or other seed in one and the same operation with the planting and at any suitable distance from two to five inches below the seed, so that the fertilizer will be placed where it will do the most good and will not be depreciated by evaporation or be blown away by the wind or be chopped away by the hoes.

It consists in the novel construction and arrangement of the devices, which I will now proceed to describe, reference being had to the accompanying drawings, in which—

Figure 1 is a side elevation, partly in section. Fig. 2 is a plan view, and Fig. 3 a vertical transverse section on line 3 3 of Figs. 1 and 2.

In the drawings, 1 is an ordinary plow-beam, to which is clamped by a suitable yoke-clamp 6 the hollow shank 3 of the plow, to the lower end of which is bolted the shovel-plow blade or hoe 2. This hollow shank leads from the fertilizer-box above and is open at its lower end, and the plow-blade 2 is made narrow and deep, and its wings are bent backward around the lower end of the hollow shank on both sides to hold the furrow open at the lower end of the hollow shank long enough to allow the guano to fall to the bottom of the deep furrow, after which the soil closes up in the furrow and covers the guano to a depth of several inches before the seed are deposited from the seed-spout 5 immediately behind the hollow shank. Immediately behind this seed-spout is an inclined coverer-blade 4, connected to the lower end of a spring, which is clamped in the yoke of the plow-beam. This coverer-blade is set inclined to the draft, so that it clears itself of trash, and its function is to cover up the seed after they have been deposited on the ground above the guano, there being several inches of soil between the guano and the seed.

On top of the plow-beam is arranged a hopper, which is made in two parts, the front part 7 forming the fertilizer-box and the rear part 8 the seedbox. The fertilizer-box communicates at its bottom with the hollow shank 3 and the seedbox with the spout 5. The fertilizer-box is made with a bottom having two levels and a short vertical wall connecting the two levels, as seen in Fig. 3. This vertical wall has a hole through it, which, being in the thin wall standing edgewise, does not allow the guano to drop through it when the machine is standing still, but allows the guano to pass when agitated by a stirrer-wheel 9, whose fingers are in a plane close beside the vertical wall and force the guano laterally through the hole in the same. Sliding along the side of the vertical wall in the bottom of the fertilizer-box is an adjustable slide 10, which protrudes through the front of the box and by opening or closing the feed-hole more or less regulates the amount of guano that is to be deposited. This slide may be graduated and marked to indicate the quantity of guano to the acre.

In the seedbox there is a stirrer-wheel 11 and also a cut-off lever 12, which is fulcrumed to the rear wall of the box about midway its length and has its lower end curved to fit the curved bottom of the box and adapted to be thrown over the discharge-hole in the same through which the seed pass. This lever is held in position by a clamp-button 13.

The two stirrer-wheels of the hopper are rigidly attached to shafts that extend through the sides of the hopper and have rigidly attached to them sprocket-wheels A and B, which are driven by a chain-belt or perforated leather belt D, which passes down and around a sprocket-wheel E on the shaft of a running-wheel F. This running-wheel is journaled in a downwardly and rearwardly projecting bracket carried by the rear end of the beam, and as said wheel travels on the ground it furnishes the power to rotate the stirrer. To take up slack in the belt or chain, a belt-tightener G is hung upon a swinging arm from one of the handles and is allowed to press upon the belt or chain.

The great advantage of my fertilizer-distributer and planter is that it inserts the guano into the ground at any desired depth below the seed and at the same time that the planting is done. This gives the farmer an opportunity to prepare his land and to hold his guano in the house and out of the weather until the seed is ready to get the benefit of it— that is to say, the ammonia and other volatile qualities of the fertilizer are not lost by exposure to wind and rain, but the guano being buried beneath the seed and with several inches of dirt between such volatile emanations are saved and rise through the soil in such a slow way as to give the seed the full benefit of it. Furthermore, the guano being placed very deep in the soil it is not liable to be chopped away from the plants by the action of the hoe or cotton-chopper.

My device may also be used to fertilize in the same economical way plants already growing by virtue of the deep penetration of the plow-blade and the automatic covering over of the furrow opened beside the row of plants.

For a modified use of my device a common corn-box may be attached to the plow in the place of the guano-box or in the place of the cotton-seed box to enable the device to plant corn. Corn may thus be planted in dry weather, as the seed are planted deep and are kept moist when deposited deeply in the furrow.

Having thus described my invention, what I claim as new, and desire to secure by Letters Patent, is—

1. A deep-level fertilizer-depositor, consisting of a fertilizer-box, a horizontal beam 1, a hollow shank leading from the box and opening at its lower end, a yoke 6 embracing the beam and the hollow shank, a narrow and deep shovel-plow secured to the lower end of said hollow shank and having its side wings bent around and extending rearwardly past the hollow shank to deeply bury the fertilizer, a seed-hopper with seed-spout arranged next behind the hollow shank to deposit seed on the top of the earth which falls into the furrow, a coverer for the seed arranged behind the seed-spout and a support for the coverer extended through and secured by the same yoke which holds the hollow shank, substantially as and for the purpose described.

2. A fertilizer-depositor having a fertilizer-box with its bottom formed into two levels connected by a vertical wall having a hole opening laterally through the said vertical wall, a stirrer arranged on an axis above the higher level and in a plane immediately beside the vertical wall, and a sliding feed-regulator arranged in a vertical plane beside the vertical wall and extending through the front of and outside the fertilizer-box to regulate the flow therefrom as described.

JOHN B. CROWDER.

Witnesses:
   J. Q. DILLARD,
   G. S. ASHWORTH.